C. K. ORTON.
IMPELLING PRESSURE ROLLER FOR WOOD PLANING MACHINES.
APPLICATION FILED JULY 5, 1910.
985,366.
Patented Feb. 28, 1911.
3 SHEETS—SHEET 1.
Fig. I
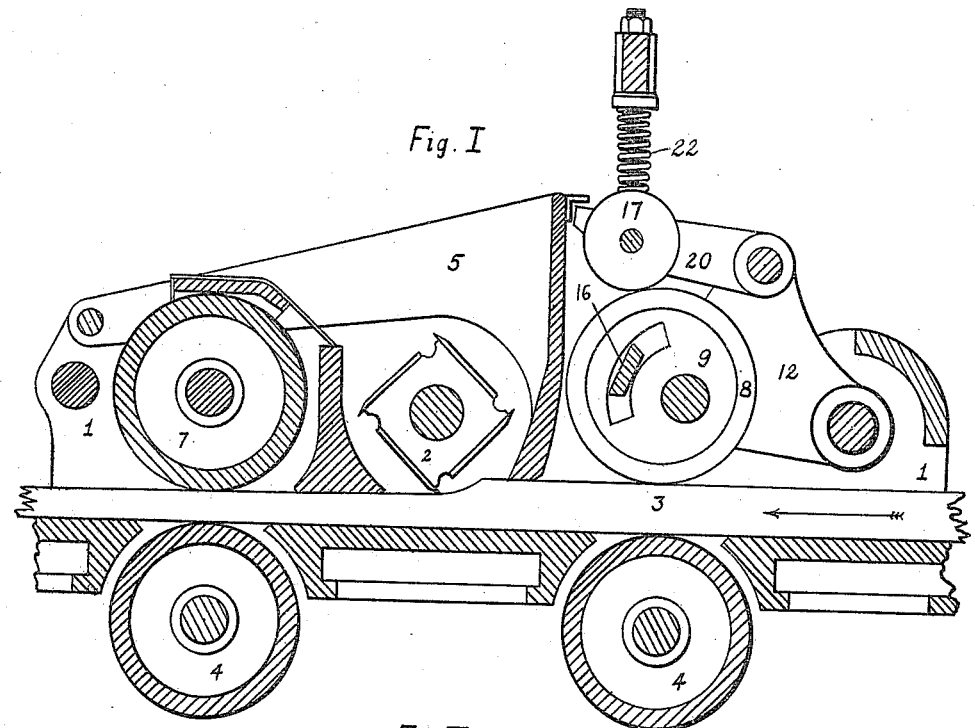
Fig. II
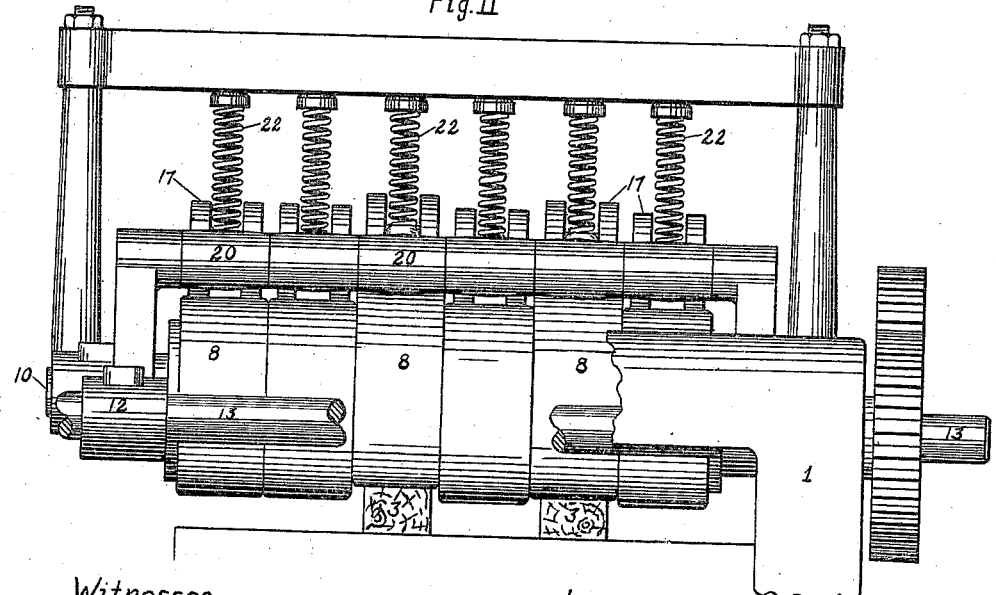
Witnesses.
Inventor.
Collins K. Orton.

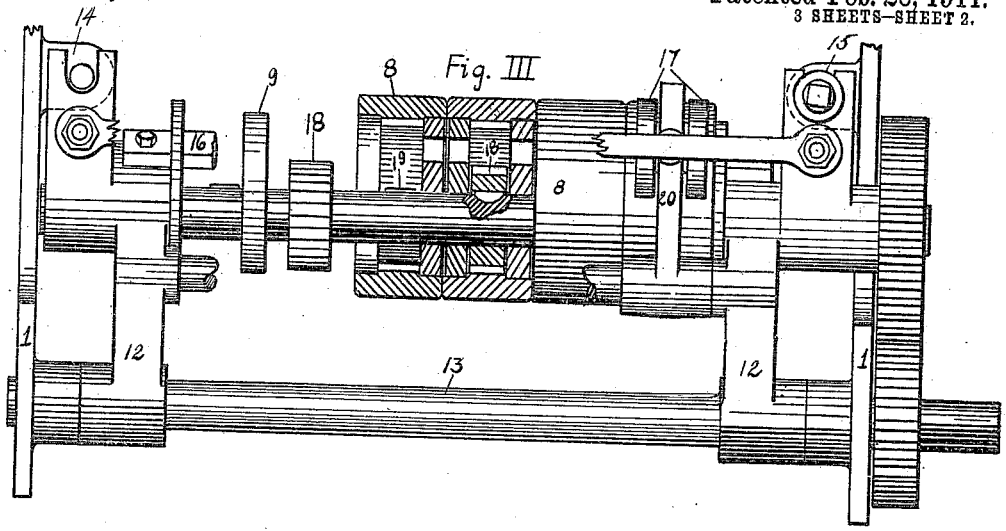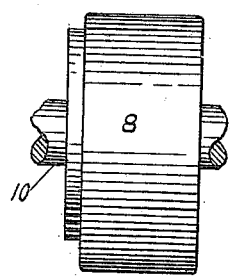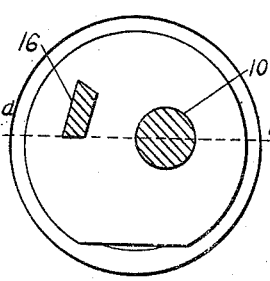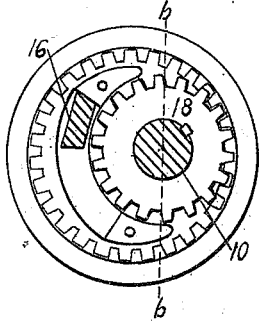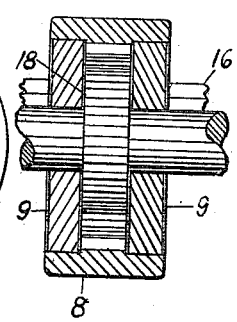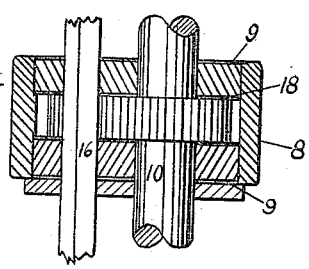

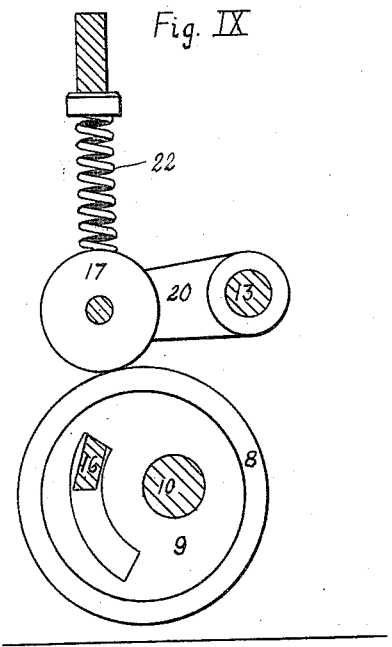
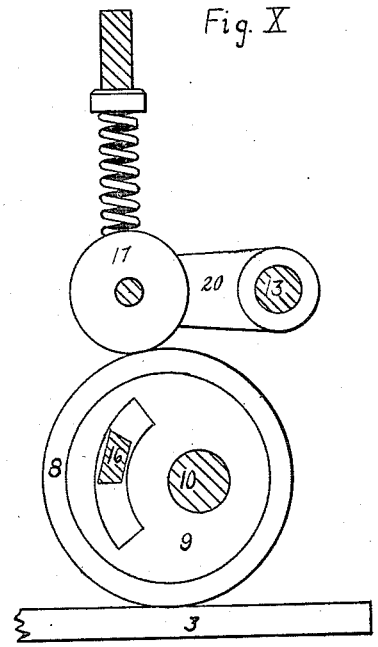
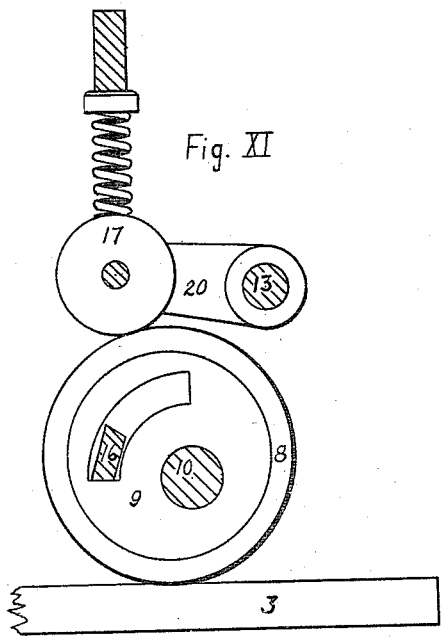
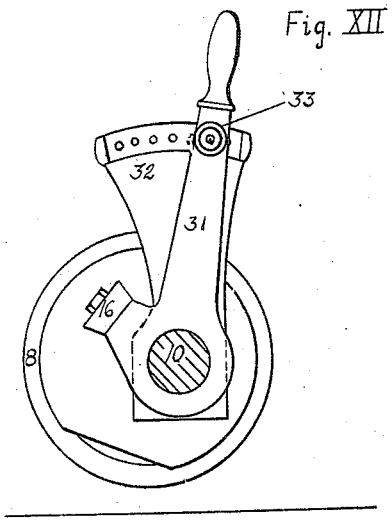

UNITED STATES PATENT OFFICE.

COLLINS KNAPP ORTON, OF SAN FRANCISCO, CALIFORNIA.

IMPELLING PRESSURE-ROLLER FOR WOOD-PLANING MACHINES.

985,366.  Specification of Letters Patent.  Patented Feb. 28, 1911.

Application filed July 5, 1910. Serial No. 570,500.

*To all whom it may concern:*

Be it known that I, COLLINS K. ORTON, a citizen of the United States of America, residing at San Francisco, in the county of San Francisco and State of California, have invented certain new and useful Improvements in Impelling Pressure - Rollers for Wood-Planing Machines; and I hereby declare the following to be a full, clear, and exact description of the same, reference being had to the accompanying drawings, forming a part of this specification.

This invention relates to an improved mechanism for advancing or impelling through wood planing machines, the timber to be planed. These rollers may be divided transversely into sections. They independently bear upon, grip and advance pieces of timber whose cross section may vary in thickness which are being planed at the same time.

The device as a whole, corresponds in so far as pressure is concerned to an improvement in pressure rollers for wood planing machines described in Letters Patent Number 785825 granted to me on March 28th, 1905.

The present invention has the function of impelling the timber or material through the planing machine in addition to the pressing function of the earlier invention.

The present invention provides an impelling as well as pressure sectional roller which permits, automatic adjustment and alinement of the roller sections, as the shape of the timber may require.

The whole is constructed substantially as shown in the drawings herewith and forming a part of this specification, except in so far as such construction may be modified to meet the requirements of different types of wood planing machines or varied forms of timber.

The objects of the invention are to attain a uniform impelling thrust over the whole width the pieces being planed so they will be impelled in a straight line; and distribute tractive effort uniformly.

Referring to the drawings:—Figure I is a central longitudinal section through a portion of a wood planing machine provided with my improvements. Fig. II is an end view of the same machine or a view of my improved sectional roller at a right angle to Fig. I. Fig. III is a plan view of the same machine, partially in section with some modifications of the drawing, in each case to better explain the construction. Fig. IV is an enlarged exterior front elevation of one of the end sections of the roller, along with a dust tight cover. Fig. V is an end elevation at a right angle to Fig. IV. Fig. VI is an enlarged transverse section on the line $a$—$a$ in Fig. I. Fig. VII is an end elevation of one of the roller sections, at a right angle to Fig. III, with the dust tight cover removed. Fig. VIII is a transverse section on the line $b$—$b$ in Fig. VII. Figs. IX, X and XI show positions of the roller at different heights of their vertical range when operating on pieces of different thickness. Fig. XII shows the means employed to raise and lower the roller sections by means of a bell-crank lever, held in position by the sector; and the detent bar secured to the bell-crank lever.

In the construction of rollers to impel the timber in wood planing machines, there are the two functions to be performed; holding down or pressing and advancing the timber. The strains in the two cases are at an angle of approximately ninety degrees of arc. The thrust, that is the resultant of these strains or lines of force, being direct and torsional on the different members, give rise to some problems partially explained in Figs. IX, X, and XI. Those strains are also affected by the manner of mounting the rollers, whether on radial members, or bearings that slide. Of course such strains are when the impelling power or turning moments are directly from the driving shaft, but when transmitted through eccentric bearings, the impelling and pressing functions may conflict, as the diagrams will show and certain proportions may be varied according to results required.

As variations of thickness such as occur in roughly sawed timber may exceed the range of independent adjustment provided for the roller sections, the driving shaft and its connected parts may be moved on a radial frame where the construction permits.

In some instances the roller shaft bearings are set into pockets, in the main frames of the planing machine. In cases of this kind the construction shown in Fig. XII, may be employed.

While I have described my wood planing machine rollers as divided into sections longitudinally; it will be understood however, that the mechanism of each section can act independently and is applicable to single and undivided rollers, operating in like manner for timbers of irregular section. So the invention is not confined to a roller divided into sections.

In roller planing machines in which the material is impelled between rollers under pressure, variation of shape prevents it being firmly gripped by straight rigid rollers, which causes an intermittent impelling motion, and consequently an imperfect cutting effect. This also occurs when two or more pieces of narrower width are being planed at the same time.

An important feature of my invention is in definitely limiting the range of the roller's oscillation around the driving shaft by a stop or detent bar, common to all the roller sections and thus enabling the employment of true geometrical wheel teeth and avoiding distorted gearing, which causes great frictional resistance in wheels of small size.

The present invention overcomes these difficulties by the construction now to be described.

1, 1, are parts of the main supporting frame; 2, the cutting member or cylinder; 3, the timber being planed; 4, the ordinary continuous lower feeding rollers; 5, a hinged pressure bar that bears close to the cutters or knives 2; 7, is an ordinary continuous pressure roller that bears upon the surface of the timber 3, after it is reduced by the knives to a uniform thickness, and 8 represents the sectional pressure impelling roller. This roller 8, may be made of any required number of sections to suit the width of the machine, so mounted that each section can rise and fall independently, as indicated in Fig. II. To enable this motion I mount these rollers 8, loosely on eccentric or cam bearings 9, that are in turn loosely fitted on a continuous driving shaft 10, that passes through the whole and is supported by the bearing frames 12. These bearing frames 12, are mounted loosely on an intermediate shaft 13, and rest on and are secured to, the main supporting frames 1—1, by means of bolts passing through the slots 14. This construction is shown in Fig. III.

The bearings of the roller sections 8, revolve freely on the eccentric bearings 9, which turn freely on the driving shaft 10, within certain limits indicated in Figs. XI and XII. The range of the eccentric bearings around the driving shaft 10, is determined by a detent bar 16, that passes loosely through the slots in the eccentric bearings 9, Figs. IX and XI.

The detent bar is securely mounted at each end to the bearing frames 12, as shown in Fig. III, or is secured to the bell-crank lever 31, as shown in Fig. XII.

When the rollers 8, are not bearing on the timber 3, they drop down by gravity to the position shown in Fig. VII, but are free to be raised with their eccentric bearings 9, to the position indicated in Figs. I and II. The whole series of rollers can be raised as a unit, by means of the bell-crank lever 31, Fig. XII; or by means of elevating the bearing frame 12, with the collar bolt 15, Fig. III. The bell-crank levers 31, are loosely mounted on the driving shaft 10, and are provided with a sector 32, and locking pin 33, so that the rollers 8, when set in position will bear upon the thinnest pieces to be planed and their vertical range be only what deviation in the timber requires, as shown in Fig. XII.

Elastic pressure is applied on the rollers 8, by pairs of superposed rollers 17, mounted on the radial bars 20, separately pressed down by a series of springs 22, as shown in Fig. I, and Fig. II.

Rotary motion is imparted to the rollers 8, by means of spur pinions 18, whose teeth mesh into the internal gear teeth of the rollers 8, these spur pinions 18, are secured to the driving shaft 10, as shown in Figs. III, VI, VII, and VIII.

Having thus explained the nature and objects of my invention and the manner of applying the same, what I claim as new and desire to secure by Letters Patent is:—

1. In a wood planing machine, an impelling and pressure roller divided into sections and mounted on oscillating eccentric bearings that have a partial revolution about a driving shaft, a detent or through bar common to all the roller sections, but regulating independently the range of their oscillation, substantially as described.

2. In a wood planing machine, an impelling and pressing roller or rollers, divided into sections transversely, the sections eccentrically mounted on a driving shaft, concentric slots in these eccentrics and a bar extending through these slots to limit severally the oscillation of the eccentrics and rollers each way and preserve the mesh of internal tooth wheels that drive the rollers, substantially as described.

3. In a wood planing machine, a sectional roller to impel and press down the timber acted upon; these rollers mounted on eccentric bearings or cams that have a limited rotary movement to permit their vertical adjustment; a driving shaft with pinions to drive these rollers by internal gears and a perforation through all the eccentric bearings, to admit of a stop or detent bar to limit their range; and means to apply pressure independently to the different sections of the roller, combined and operating substantially as described.

4. In a wood planing machine, a sectional roller to impel and press down the timber to be acted upon; these rollers mounted on eccentric bearings or cams that have a limited rotary movement to permit their vertical adjustment; a driving shaft with toothed pinions to drive these rollers by internal gears and a perforation through all the eccentric bearings, to admit of a stop or detent bar to limit their range; and means to raise and lower this stop or detent bar so all the sections of the roller can be raised or lowered at the same time, substantially as shown.

5. In a wood planing machine, a sectional roller to impel and press down the timber acted upon, these rollers mounted on eccentric bearings or cams that have a limited rotary movement to permit their vertical adjustment; a driving shaft pinions to drive these rollers by internal gears and a perforation through all the eccentric bearings to admit of a stop or detent bar, so all the sections of the roller can be raised or lowered at the same time; a covering plate at each end of the roller, mounted loosely on the driving shaft and fitted closely over the detent bar, substantially as shown and described.

COLLINS KNAPP ORTON.

Witnesses:
C. H. MITCHELL,
D. B. RICHARDS.

Copies of this patent may be obtained for five cents each, by addressing the "Commissioner of Patents, Washington, D. C."